United States Patent [19]

Suzuki et al.

[11] Patent Number: 4,707,818
[45] Date of Patent: Nov. 17, 1987

[54] METHOD AND APPARATUS FOR RECORDING DIGITIZED INFORMATION ON A DISC

[75] Inventors: Tadao Suzuki; Shoichi Nakamura, both of Tokyo; Hisao Nishioka, Kamagaya; Yutaka Ohkubo, Tokyo, all of Japan

[73] Assignee: Sony Corporation, Tokyo, Japan

[21] Appl. No.: 666,237

[22] PCT Filed: Mar. 2, 1984

[86] PCT No.: PCT/JP84/00081
§ 371 Date: Oct. 23, 1984
§ 102(e) Date: Oct. 23, 1984

[87] PCT Pub. No.: WO84/03580
PCT Pub. Date: Sep. 13, 1984

[30] Foreign Application Priority Data

Mar. 4, 1983 [JP] Japan .................................. 58-35459

[51] Int. Cl.$^4$ .................................................. G11B 7/00
[52] U.S. Cl. ........................................ 369/59; 369/32; 360/39; 358/342
[58] Field of Search ..................... 369/50, 59, 240, 32, 369/33, 59, 240, 267; 360/32, 39; 358/342

[56] References Cited

U.S. PATENT DOCUMENTS 4,389,681 6/1983 Tanaka et al. ..................... 369/59 X
4,397,011 8/1983 Ogawa .............................. 369/59 X Primary Examiner—Robert L. Richardson
Attorney, Agent, or Firm—Lewis H. Eslinger; Alvin Sinderbrand

[57] ABSTRACT

Digital data consisting of different kinds of digital audio signals having sampling frequencies, numbers of quantization bits and the like that are different from those of the two-channel digital audio signals, display data, program data, and the like are recorded in the same signal format as that of the two-channel digital audio signals. A code signal representing either of the two-channel digital audio signals and the digital data is recorded and control data indicative of the linear velocity of the digital disc upon reproduction are inserted in every frame of the recording signal. One block of the digital data is formed by a predetermined amount of data and the same control data used for controlling the processing of the digital data is recorded at least twice in one block. The digital disc is rotated at a constant linear velocity on the basis of the control data upon reproduction. The reproduced audio data from the reproducing circuit is D/A converted, and the pass band of the low-pass filter to which the reproduced analog audio signals are supplied is adapted to the band of the reproduced analog audio signals.

6 Claims, 30 Drawing Figures

Fig. 5

$$H_{c1} \cdot V^T = \begin{Bmatrix} S_{10} \\ S_{11} \\ S_{12} \\ S_{13} \end{Bmatrix} = \begin{bmatrix} 1 & \alpha^{31} & 1 & \alpha^{30} & \alpha^{29} & 1 & \alpha^{28} & \cdots & 1 & \alpha^3 & \alpha^2 & 1 & \alpha^1 & 1 \\ 1 & \alpha^{62} & 1 & \alpha^{60} & \alpha^{58} & 1 & \alpha^{56} & \cdots & 1 & \alpha^6 & \alpha^4 & 1 & \alpha^2 & 1 \\ 1 & \alpha^{93} & 1 & \alpha^{90} & \alpha^{87} & 1 & \alpha^{84} & \cdots & 1 & \alpha^9 & \alpha^6 & 1 & \alpha^3 & 1 \end{bmatrix} \begin{Bmatrix} W_{12n-12,A} \\ W_{12n-12(1D+1),B} \\ W_{12n+1-12(2D+1),A} \\ W_{12n+1-12(3D+1),B} \\ \vdots \\ P_{12n} \\ P_{12n+1} \\ P_{12n+2} \\ P_{12n+3} \end{Bmatrix}$$

Fig. 6

$$H_{c2} \cdot V^T = \begin{bmatrix} S_{20} \\ S_{21} \\ S_{22} \\ S_{23} \end{bmatrix} = \begin{bmatrix} 1 & \alpha^{27} & \alpha^{26} & \alpha^{25} & \cdots & 1 & 1 & 1 & 1 \\ 1 & \alpha^{54} & \alpha^{52} & \alpha^{50} & \cdots & \alpha^{4} & \alpha^{3} & \alpha^{2} & 1 \\ 1 & \alpha^{81} & \alpha^{78} & \alpha^{75} & \cdots & \alpha^{8} & \alpha^{6} & \alpha^{4} & 1 \\ 1 & & & & \cdots & \alpha^{12} & \alpha^{9} & \alpha^{6} & 1 \end{bmatrix} \begin{bmatrix} W_{12n-12,A} \\ W_{12n-12,B} \\ W_{12n+1-12,A} \\ W_{12n+1-12,B} \\ \vdots \\ Q_{12n} \\ Q_{12n+1} \\ Q_{12n+2} \\ Q_{12n+3} \end{bmatrix}$$

Fig. 11
| | 1 | 2 | 3 | 4 | 5 | 6 | 7 | 8 | 9 | 10 | 11 | 12 | 13 | 14 | 15 | 16 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|---|---|---|---|---|---|---|---|---|---|---|---|---|---|
| | \<--- L-ch ---\> | | | | | | | | | | | | | | | | \<--- R-ch ---\> | | | | | | | | | | | | | | | |
| 1 | 0 | 0 | 0 | 0 | 1 | 0 | 0 | 1 | INSTRUCTION ||||||| ROW ROW |||||||| COLUMN COLUMN ||||
| 2 | 0 | 1 | 0 | 0 | 1 | 0 | 0 | 1 | INSTRUCTION ||||||| | | | | | | | | | | | | | | | |
| 3 | 1 | D1 |||| D2 ||| D3 ||| D4 ||| D5 ||| D6 ||| D7 ||| D8 |||
| 4 | 1 | D9 |||| D10 ||| D11 ||| D12 ||| D13 ||| D14 ||| D15 ||||
| 5 | 1 | D16 ||| D17 ||| D18 ||| D19 ||| D20 ||| D21 ||| D22 ||| D23 ||
| 6 | 1 | D24 ||| D25 ||| D26 ||| D27 ||| D28 ||| D29 ||| D30 ||| D31 ||
| 7 | 1 | D32 ||| D33 ||| D34 ||| D35 ||| D36 ||| D37 ||| D38 ||| D39 ||
| 8 | 1 | D40 |||| D41 ||| D42 ||| D43 ||| D44 ||| D45 ||| D46 ||||
| 9 | 1 | D47 ||| D48 ||| D49 ||| D50 ||| D51 ||| D52 ||| D53 ||| D54 ||
| 10 | 1 | D55 ||| D56 ||| D57 ||| D58 ||| D59 ||| D60 ||| D61 ||| D62 ||
| 11 | 1 | D63 ||| D64 ||| D65 ||| D66 ||| D67 ||| D68 ||| D69 ||| D70 ||
| 12 | 1 | D71 ||| D72 ||| D73 ||| D74 ||| D75 ||||||||||||
Fig. 12
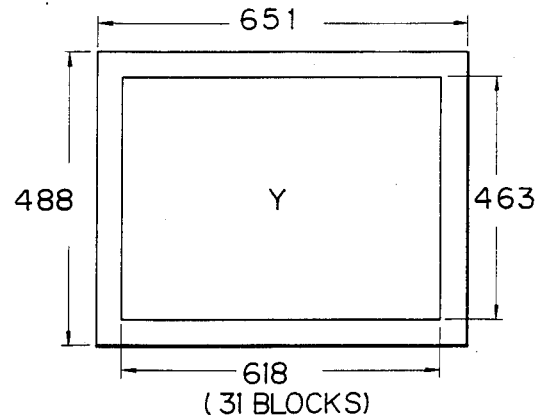
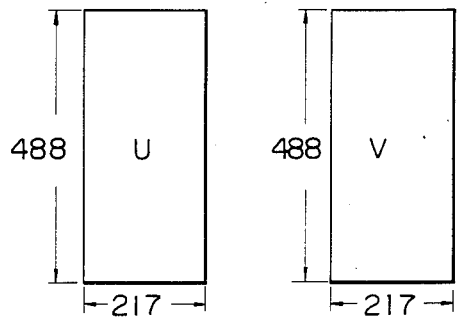

Fig. 13

| 1 | 00 | 010 | 001 | INSTRUCTION | ROW | COLUMN |
|---|----|----|----|----|----|----|
| 2 | 01 | 010 | 001 | INSTRUCTION | ROW | COLUMN |
| 3 | 1 | Y1 | | Y2 | Y3 | Y4 |
| 4 | 1 | Y5 | | Y6 | Y7 | Y8 |
| 5 | 1 | Y9 | | Y10 | Y11 | Y12 |
| 6 | 1 | Y13 | | Y14 | Y15 | |
| 7 | 1 | Y16 | Y17 | Y18 | Y19 | |
| 8 | 1 | Y20 | Y21 | V1 | V2 | |
| 9 | 1 | V3 | V4 | V5 | V6 | |
| 10| 1 | V7 | U1 | U2 | U3 | |
| 11| 1 | U4 | U5 | U6 | U7 | |
| 12| 1 | | | | | |

Fig. 14

| ITEM | CHANNEL | SF(kHz) | NUMBER OF BITS | QUANTIZATION | MAGNIFICATION FACTOR |
|---|---|---|---|---|---|
| 000 | MUTING | | | | |
| 001 | 2 ch | 22.05 | 10 | NONLINEAR | 2/5 |
| 010 | 3 ch | 22.05 | 10 | NONLINEAR | 3/5 |
| 011 | 5 ch | 22.05 | 10 | NONLINEAR | 1 |
| 100 | 2 ch | 33.075 | 12 | NONLINEAR | 3/4 |

| | 1 | 2 | 3 | 4 | 5 | 6 | 7 | 8 | 9 | 10 | 11 | 12 | 13 | 14 | 15 | 16 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|---|---|---|---|---|---|---|---|---|---|---|---|---|---|
| | L-ch ||||||||||||||||| R-ch |||||||||||||||||
| 1 | 0 | 0 | 0 | 1 | 1 | ITEM ||| INSTRUCTION |||||||||||||||||||||||
| 2 | 0 | 1 | 0 | 1 | 1 | ITEM ||| INSTRUCTION |||||||||||||||||||||||
| 3 | 1 | D1 ||||||||||| D2 |||||||||| D3 |||||||||||
| 4 | 1 | D4 ||||||||||| D5 |||||||||| D6 |||||||||||
| 5 | 1 | D7 ||||||||||| D8 |||||||||| D9 |||||||||||
| 6 | 1 | D10 ||||||||||| D11 |||||||||| D12 |||||||||||
| 7 | 1 | D13 ||||||||||| D14 |||||||||| D15 |||||||||||
| 8 | 1 | D16 ||||||||||| D17 |||||||||| D18 ||||||| D19 ||||
| 9 | 1 | D20 ||||||||||||| D21 |||||||| D22 ||||||
| 10 | 1 | D23 ||||||||||||| D24 |||||||| D25 ||||||
| 11 | 1 | D26 ||||||||||| D27 |||||||||| D28 |||||||||||
| 12 | 1 | D29 ||||||||||||||| D30 |||||||||||||||||

Fig. 17

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 0 0 | 0 1 1 || 1 0 0 || INSTRUCTION |||||||||||
| 2 | 0 1 | 0 1 1 || 1 0 0 || INSTRUCTION |||||||||||
| 3 | 1 | D1 |||||| D2 ||||| D3 ||||
| 4 | 1 | D4 |||||| D5 ||||||||||
| 5 | 1 | D6 |||| D7 |||||| D8 |||||
| 6 | 1 | D9 |||||| D10 ||||||||||
| 7 | 1 | D11 ||| D12 |||||| D13 |||||
| 8 | 1 | D14 ||||| D15 ||||||||||
| 9 | 1 | D16 || D17 |||||| D18 ||||||
| 10 | 1 | D19 ||||| D20 |||||| D21 ||||
| 11 | 1 | D22 |||||| D23 |||||||||
| 12 | 1 | D24 |||||||||||||||

| 1 | 0 0 | 1 0 0 | 0 0 1 | INSTRUCTION | ADDRESS | | |
|---|---|---|---|---|---|---|---|
| 2 | 0 1 | 1 0 0 | 0 0 1 | INSTRUCTION | ADDRESS | | |
| 3 | 1 | D1 | | D2 | D3 | | D4 |
| 4 | 1 | D1 | | D2 | D3 | | D4 |
| 5 | 1 | D5 | | D6 | D7 | | D8 |
| 6 | 1 | D5 | | D6 | D7 | | D8 |
| 7 | 1 | D9 | | D10 | D11 | | D12 |
| 8 | 1 | D9 | | D10 | D11 | | D12 |
| 9 | 1 | D13 | | D14 | D15 | | D16 |
| 10| 1 | D13 | | D14 | D15 | | D16 |
| 11| 1 | D16 | D17 | D18 | D19 | ✕ |
| 12| 1 | D16 | D17 | D18 | D19 | ✕ |

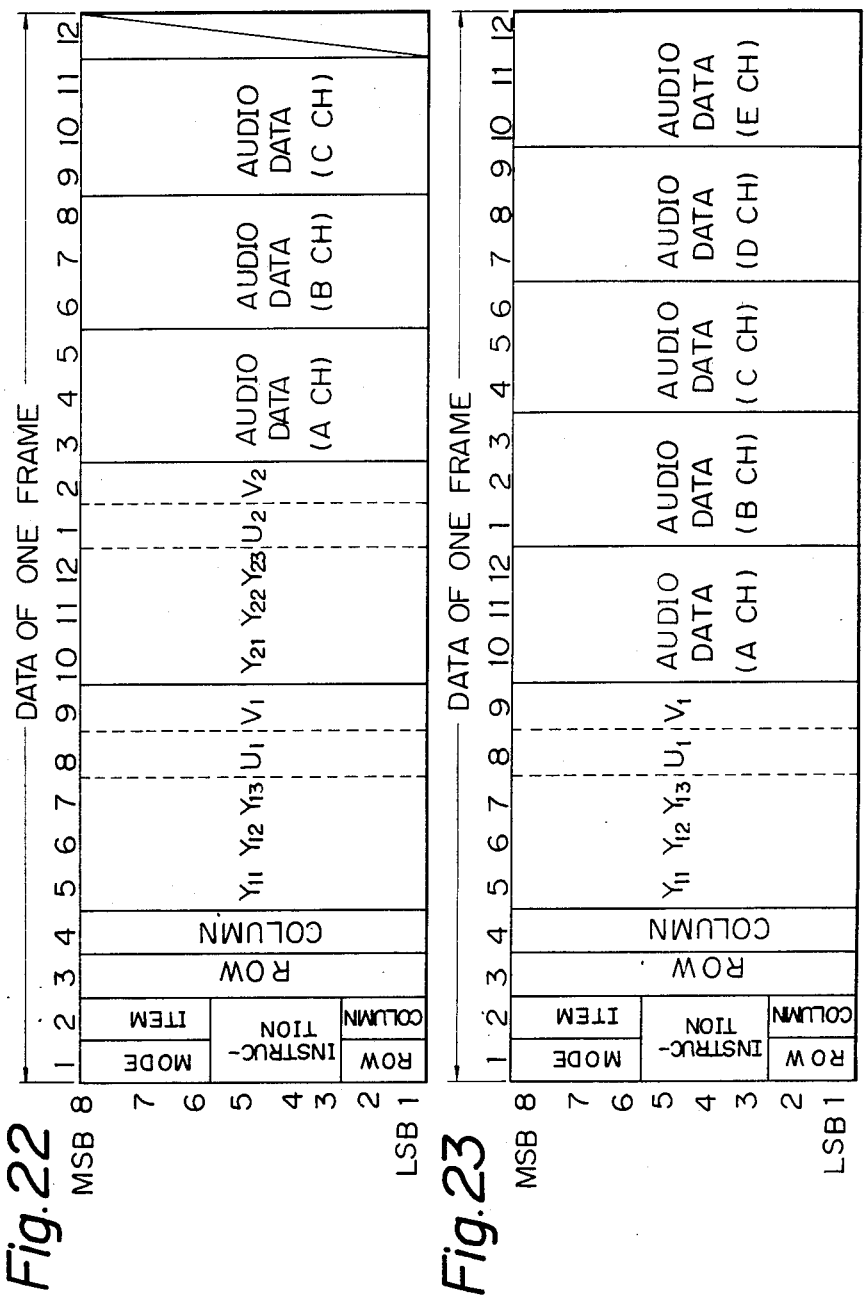

METHOD AND APPARATUS FOR RECORDING DIGITIZED INFORMATION ON A DISC

TECHNICAL FIELD

The present invention relates to a data transmission system for recording digital data other than conventional two-channel digital audio signals by use of the format of a digital disc on which, e.g., the two-channel digital audio signals are recorded.

BACKGROUND ART

A system using an optical type digital audio disc (called a compact disc) is a disc system which can reproduce stereophonic music of high quality. If digital data such as display data, program data or the like other than stereophonic music can be reproduced by this disc system, by equipping a display device, it is possible to realize an apparatus for reproducing visual information such as graphic diagrams and statistics, drawings by still pictures, and the like, and to realize a video game apparatus. In addition, by recording sound information and image information, it is possible to realize a complete art collection, a travellers' guide, education system, and the like by use of both information, so that the range of applications of compact disc systems can be extended. In this case, an amount of audio data which can be transmitted decreases since still picture data is recorded.

One of such reduction is a decrease in number of bits, namely, one sample consists of eight bits as compared with the existing compact disc in which one sample consists of sixteen bits. In other words, a dynamic range is reduced. For example, the dynamic range of 96 dB is obtained in case of 16 bits, while only the dynamic range of 48 dB is derived in case of eight bits. However, for this problem, a value of 60 dB or 78 dB or the like which is near the inherent dynamic range can be obtained using a D-PCM method or an analog compressing/expanding method.

Another problem relates to a decrease in transmission band due to reduced sampling data which can be transmitted. In the existing compact disc, the transmission band of 20 kHz is derived. However, the transmission band is reduced to about 10 kHz when the sampling data is reduced because of the recording of the still picture data. Even in this case, a large inconvenience for the reproduction of a voice will not be caused. However, the transmission band of about 15 kHz is desirable to reproduce a music.

It is an object of the present invention to provide a data transmission system which can reproduce digital data other than stereophonic music signals by use of the existing disc reproducing apparatus as it is.

DISCLOSURE OF THE INVENTION

This invention relates to a data transmission system using a digital disc whereby the even-number designated and odd-number designated digital data are interleaved and are recorded on the disc as signal tracks in the circumferential direction and are reproduced therefrom, wherein the same control data among the control data which are used for controlling the processing of the digital data is recorded at least twice at a predetermined interval.

According to the present invention, it is possible to prevent errors in the control data upon reproduction, thereby enabling the digital data to be accurately processed.

BRIEF DESCRIPTION OF DRAWINGS

FIGS. 5 and 6 are diagrams which are used for explaining the decoding operation of an error correcting decoder;

FIGS. 10 and 11 are schematic diagrams which are used for explaining a graphic mode and a data arrangement of one block in this mode;

FIGS. 12 and 13 are schematic diagrams which are used for explaining a still picture mode and a data arrangement of one block in this mode;

FIGS. 14, 15A–E, 16, and 17 are schematic diagrams which are used for explaining a sound mode and a data arrangement of one block in this mode;

FIGS. 20, 21, 22, and 23 are schematic diagrams showing arrangements of one block of digital data in other embodiments of the invention.

BEST MODE FOR CARRYING OUT THE INVENTION

One embodiment of the present invention relates to an example whereby the present invention was applied to a compact disc.

A data arrangement of a signal recorded on the compact disc will be described with reference to FIGS. 1 and 2.

Figure 1:
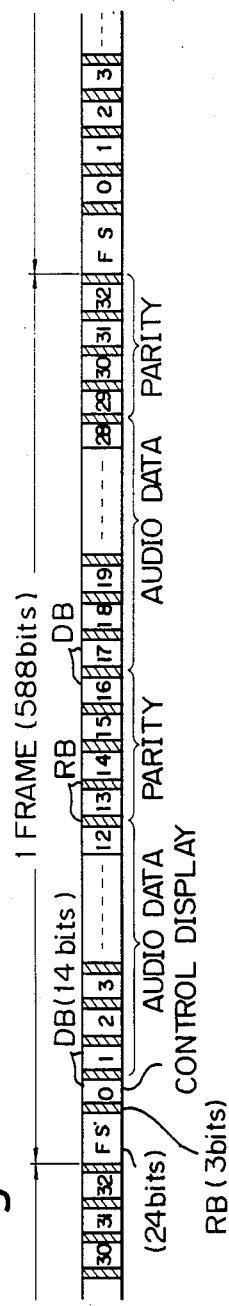
FIGS. 1 and 2 are schematic diagrams which are used for explaining a data arrangement of recording data on a compact disc to which the present invention is applied.

FIG. 1 shows a data stream recorded on the compact disc. One frame consists of 588 bits of the recording data and DC component suppressed bits RB of three bits are provided after a frame sync pulse FS of a particular bit pattern at every frame. Further, thereafter, the 0th and 32nd data bits DBs each consisting of 14 bits and the 3 bit DC component suppressed bits RB are alternately arranged. The 0th data bit among these data bits DBs is called a subcoding signal or user's bit and is used for controlling the playback of the disc and the display of the relevant information, and the like. The 1st to 12th and the 17th to 28th data bits DBs are allocated for the audio data in the main channel, while the remaining 13th to 16th and the 29th to 32nd data bits DBs are allocated for the parity data of the error correction codes in the main channel. Each data bit DB is the data of which the 8-bit data was converted to the 14-bit data due to the EFM modulation for performing the 8-to-14 conversion upon recording.

Various processings are performed on a 98-frame unit basis of the digital signal mentioned above.

Figure 2:
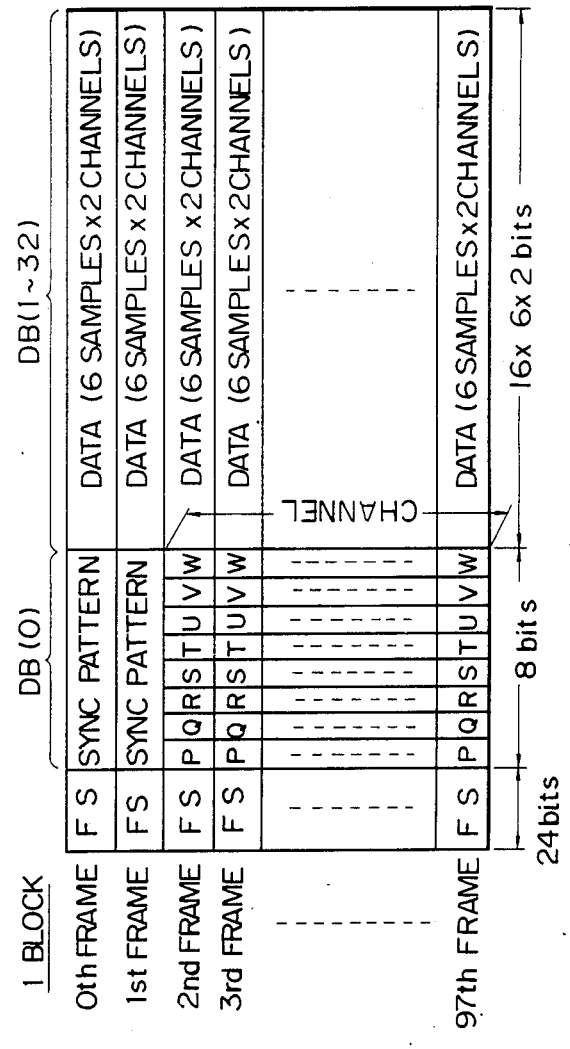

FIG. 2 shows the state in that the 98 frames are sequentially arranged in parallel whereby it is assumed that each data bit DB is constituted by eight bits excluding the DC component suppressed bits. Subcoding signals P to W in the 0th and the 1st frames form sync patterns as predetermined bit patterns. On the other hand, with respect to the Q channel, CRC codes for error detection are inserted into the 16 frames on the end side among the 98 frames.

The P-channel signal may be a flag to indicate a pause and a music program, and a level of this signal is set to low in the case of music program, while it is set to high in the case of pause. A pulse at a period of 2 Hz is arranged in the lead-out interval. Therefore, by detecting and counting the P channel, the designated music programs can be selected and reproduced. In the Q channel, the same kind of more complicated control can be performed. For instance, the information in the Q channel is stored in a microcomputer provided for the disc reproducing apparatus and it is possible to perform the random selection of music programs such that another music program is immediately played back even when a music program is being played back. The other R to W channels than the P and Q channels are used to indicate a versifier, composer, explanation, text, etc. of the music program recorded on the disc or to explain them by a voice.

Figure 3A:
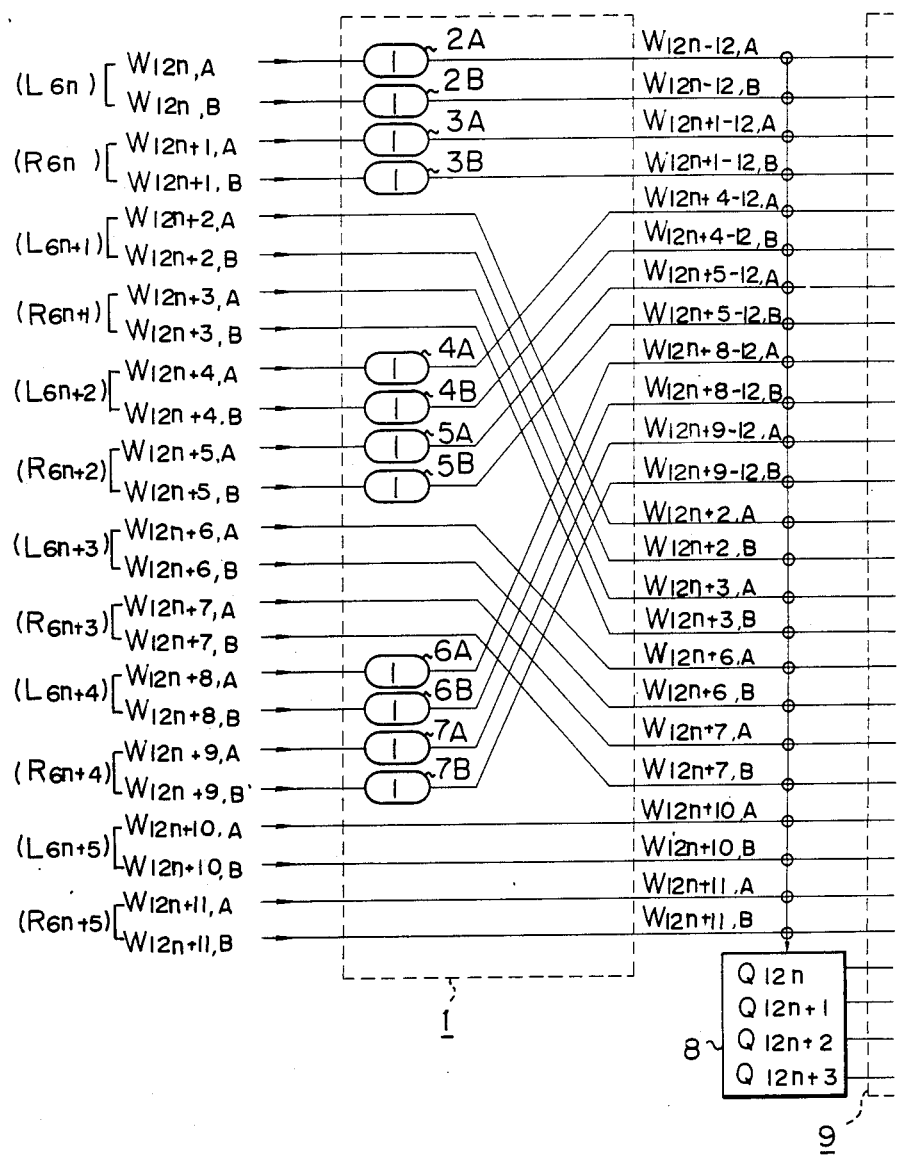
FIGS. 3A and 3B are block diagrams showing an example of an encoder for error correction codes which are added to the data on the compact disc to which the invention is applied.
Figure 3B:
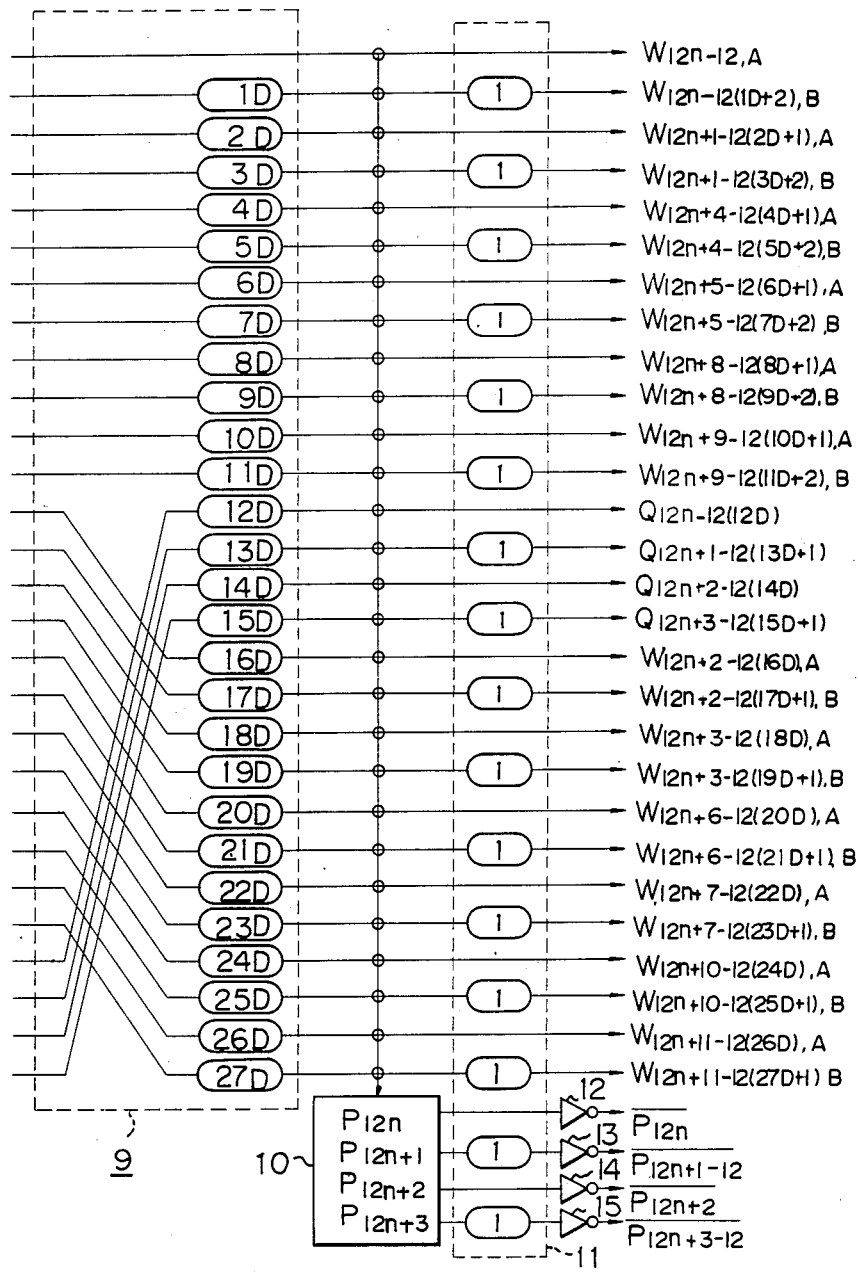

The data bit DB in each frame is error correction coded as an 8-bit data by an encoder having an arrangement shown in FIGS. 3A and 3B before the EFM modulation.

FIGS. 3A and 3B show the whole arrangement of an error correction encoder provided for the recording system in which the arrangement is divided into the front and post stages. An audio PCM signal is supplied to its input side. The audio PCM signal is formed by sampling the right and left stereo signals at a sampling frequency of $f_s$ (e.g., 44.1 kHz) respectively and by converting one sample to one word (16-bit code using 2 as a complementary number). Therefore, with regard to the audio signal in the left channel, the PCM data such as ($L_0, L_1, L_2, \ldots$) of which each word is continuously arranged is obtained, while the PCM data such as ($R_0, R_1, R_2, \ldots$) of which each word is successively arranged is also derived with respect to the audio signal in the right channel. These PCM data in the right and left channels are respectively divided into six channels and the PCM data series of total twelve channels are inputted. At a predetermined timing, twelve words of ($L_{6n}$, $R_{6n}$, $L_{6n+1}$, $R_{6n+1}$, $L_{6n+2}$, $R_{6n+2}$, $L_{6n+3}$, $R_{6n+3}$, $L_{6n+4}$, $R_{6n+4}$) are inputted. In this example, one word is divided into the most significant eight bits and the least significant bits, while 12 channels are further processed as 24 channels. For the purpose of simplicity, one word of the PCM data is indicated by $W_i$ and a suffix of A is added so as to be $W_{i,A}$ with respect to the most significant eight bits, while a suffix of B is added so as to be $W_{i,B}$ with regard to the least significant eight bits, thereby discriminating them. For example, $L_{6n}$ is divided into two data of $W_{12n,A}$ and $W_{12n,B}$.

This PCM data series of 24 channels is first supplied to an even/odd interleave circuit 1. Assuming that ($n=0, 1, 2, \ldots$), the even-number designated words consist of $L_{6n}$ ($=W_{12n,A}$, $W_{12n,B}$), $R_{6n}$ ($=W_{12n+1,A}$, $W_{12n+1,B}$), $L_{6n+2}$ ($=W_{12n+4,A}$, $W_{12n+4,B}$), $R_{6n+2}$ ($=W_{12n+5,A}$, $W_{12n+5,B}$), $L_{6n+4}$ ($=W_{12n+8,A}$, $W_{12n+8,B}$). $R_{6n+4}$ ($=W_{12n+9,A}$, $W_{12n+9,B}$), respectively, while the other words are the odd-number designated words. The respective PCM data series consisting of the even-number designated words are delayed by one word by one-word delay circuits 2A, 2B, 3A, 3B, 4A, 4B, 5A, 5B, 6A, 6B, 7A, and 7B of the even/odd interleave circuit 1. Obviously, a word may be delayed longer than one word in time, for example an 8-word delay could be used. In the even/odd interleave circuit 1, the conversion is performed in the manner such that the twelve data series consisting of the even-number designated words occupy the 1st to 12th transmission channels and the twelve data series consisting of the odd-number designated words occupy the 13rd to 24th transmission channels.

The even/odd interleave circuit 1 serves to prevent that the continuous two or more words become errors with regard to the respective right and left stereo signals, with the result that the correction of these errors becomes impossible. For example, when considering the continuous three words such as ($L_{i-1}, L_i, L_{i+1}$), in the case where $L_i$ is wrong and this error cannot be corrected, it is desired that $L_{i-1}$ or $L_{i+1}$ is correct. This is because in case of correcting the error data $L_i$, this $L_i$ is interpolated (preceding value holding is performed) using the preceding correct word $L_{i-1}$ or the $L_i$ is interpolated by a mean value of $L_{i-1}$ and $L_{i+1}$. The delay circuits 2A, 2B, to 7A, 7B of the even/odd interleave circuit 1 are provided for allowing the adjacent words to be included in the different error correction blocks. In addition, the reason why the transmission channels are collected as the data series consisting of the even-number designated words and as the data series consisting of the odd-number designated words is to make the distance between the recording locations of the closely arranged even-number and odd-number designated words as large as possible when the data series are interleaved.

The 24-channel PCM data series arranged in the first arrangement state appear at the output of the even/odd interleave circuit 1. Each one word is fetched from the respective PCM data series and is supplied to an encoder 8, so that the first check words $Q_{12n}$, $Q_{12n+1}$, $Q_{12n+2}$, and $Q_{12n+3}$ are formed. The first error correction block constituted with the first check words included is as follows.

($W_{12n-12,A}$, $W_{12n-12,B}$, $W_{12n+1-12,A}$, $W_{12n+1-12,B}$, $W_{12n+4-12,A}$, $W_{12n+4-12,B}$, $W_{12n+5-12,A}$, $W_{12n+5-12,B}$, $W_{12n+8-12,A}$, $W_{12n+8-12,B}$, $W_{12n+9-12,A}$, $W_{12n+9-12,B}$, $W_{12n+2,A}$, $W_{12n+2,B}$, $W_{12n+3,A}$, $W_{12n+3,B}$, $W_{12n+6,A}$, $W_{12n+6,B}$, $W_{12n+7,A}$, $W_{12n+7,B}$, $W_{12n+10,A}$, $W_{12n+10,B}$, $W_{12n+11,A}$, $W_{12n+11,B}$, $Q_{12n}$, $Q_{12n+1}$, $Q_{12n+2}$, $Q_{12n+3}$)

In the first encoder 8, the coding processing is performed whereby the number of words of one block is ($n=28$) and the number of bits of one word is ($m=8$) and the number of check words is ($k=4$).

As shown in FIG. 3B, the 24 PCM data series and the four check word series are supplied to an interleave circuit 9. In the interleave circuit 9, the delay processing for interleave is performed after the locations of the transmission channels were changed such that the check word series are interposed between the PCM data series consisting of the even-number designated words and the PCM data series consisting of the odd-number designated words. This delay processing is carried out by inserting delay circuits having delay amounts of 1D, 2D, 3D, 4D, . . . , 26D, and 27D (wherein, D represents a unit delay amount, e.g., four words) for the respective twenty seven transmission channels excluding the first transmission channel.

The twenty eight data series arranged in the second arrangement state appear at the output of the interleave circuit 9. Each one word is fetched from these respective data series and is supplied to an encoder 10, so that second check words $P_{12n}$, $P_{12n+1}$, $P_{12n+2}$, and $P_{12n+3}$ are formed. The second error correction block consisting of 32 words which are constituted with the second check words included is as follows. ($W_{12n-12,A}$, $W_{12n-12(D+1),B}$, $W_{12n+1-12(2D+1),A}$, $W_{12n+1-12(3D+1),B}$, $W_{12n+4-12(4D+1),A}$, $W_{12n+4-12(5D+1),B}$, $W_{12n+5-12(6D+1),A}$, $W_{12n+5-12(7D+1),B}$, ..., $Q_{12n-12(12D)}$, $Q_{12n+1-12(13D)}$, $Q_{12n+2-12(14D)}$, $Q_{12n+3-12(15D)}$, $W_{12n+10-12(24D),A}$, $W_{12n+10-12(25D),B}$, $W_{12n+11-12(26D),A}$, $W_{12n+11-12(27D),B}$, $P_{12n}$, $P_{12n+1}$, $P_{12n+2}$, $P_{12n+3}$)

There is provided an interleave circuit 11 in which one-word delay circuits are inserted for the even-number designated transmission channels among the 32 data series including such first and second check words. Also, inverters 12, 13, 14, and 15 are inserted for the second check word series. The interleave circuit 11 is provided to prevent that the errors which spread over the boundary portion of the blocks easily include a number of erroneous words which cannot be corrected. On the other hand, the inverters 12 to 15 are provided to prevent the malfunction such that all of the data in one block become "0" due to the dropout upon transmission and they are determined to be the correct data by the reproducing system. An inverter may be also inserted for the first check word series for the similar purpose.

Every 32 words fetched from the respective 24 PCM data series and eight check word series finally obtained are converted to the serial data. As shown in FIGS. 1 and 2, the 16-bit sync signal and subcoding signal are added to the head of that serial data to obtain one frame. This one frame is converted from the 8-bit data to the 14-bit data and is recorded on the disc.

The encoder 8 produces the Reed Solomon error correction codes of (n=28, m=8, k=4), while the encoder 10 produces the Reed Solomon error correction codes of (n=32, m=8, k=4).

Figure 4A:
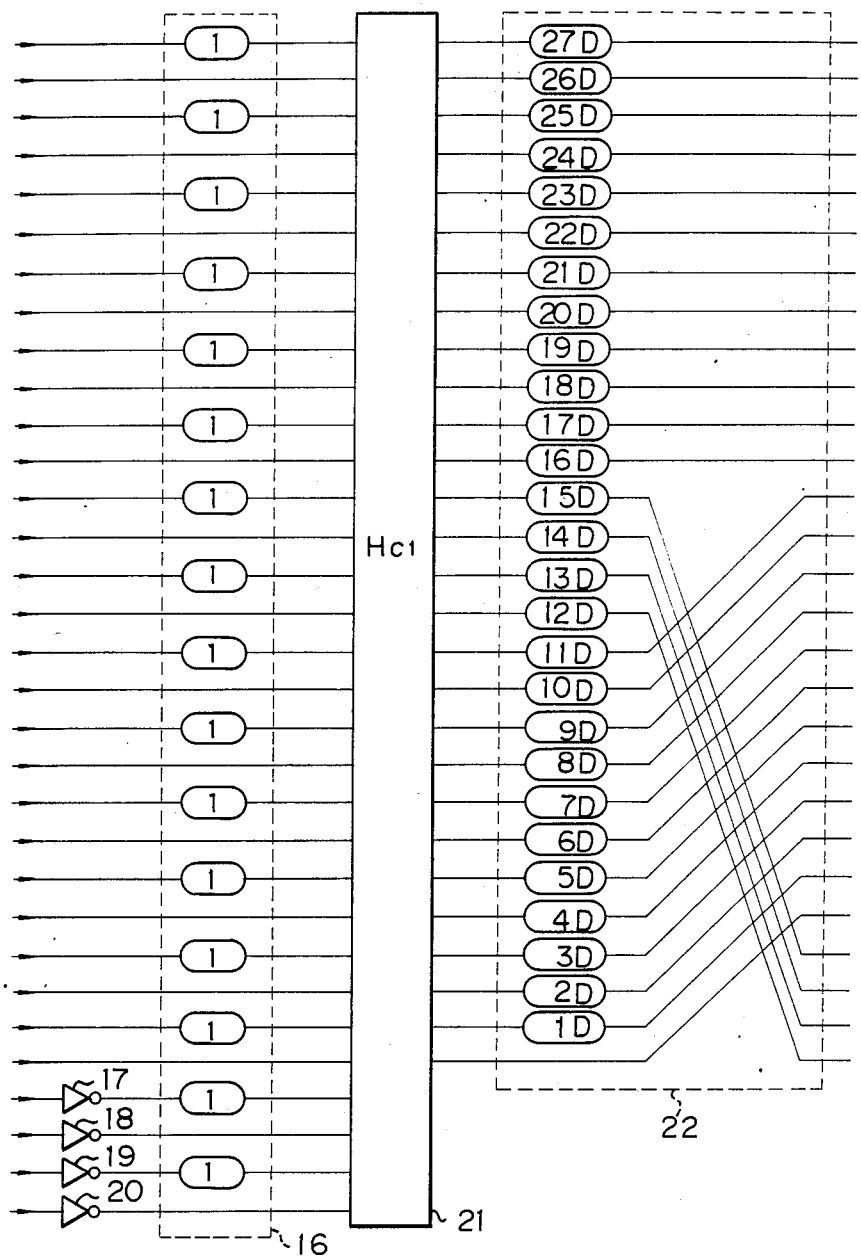
FIGS. 4A and 4B are block diagrams showing an example of a decoder corresponding to the encoder of FIG. 3.
Figure 4B:
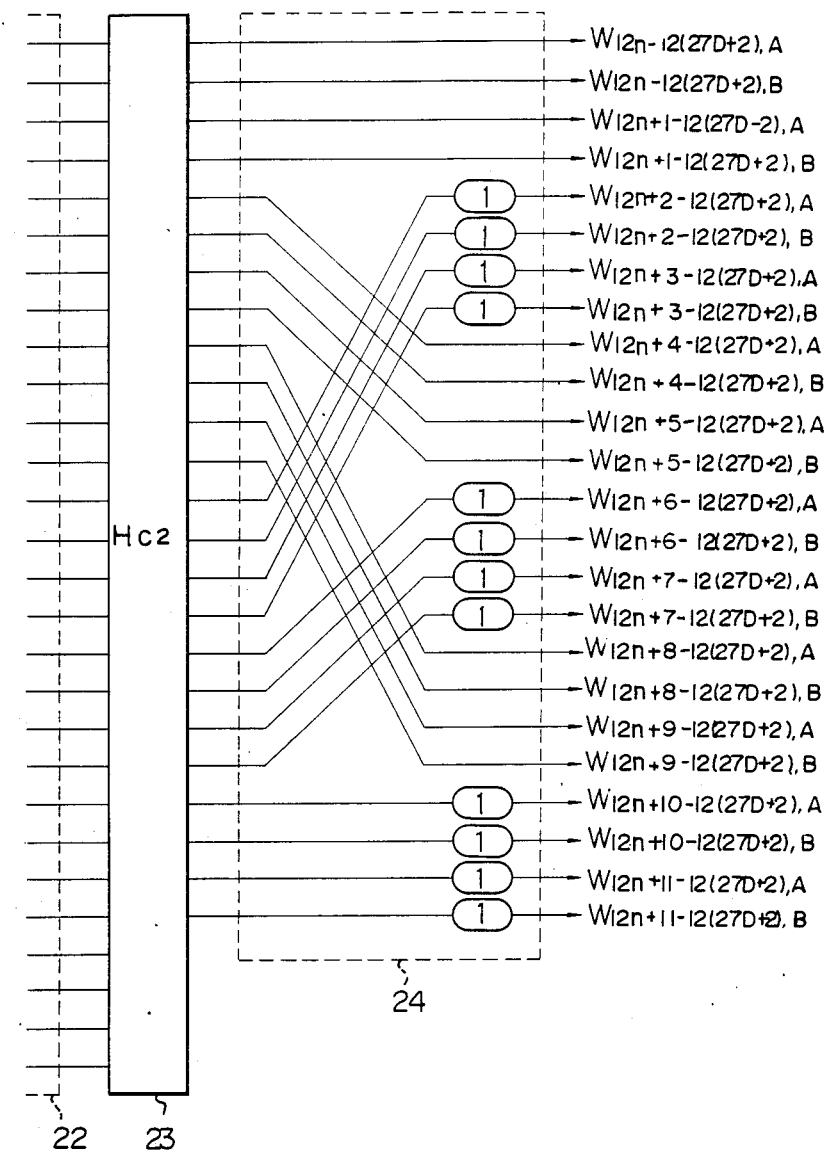

Upon reproduction of the data bits DBs, every 32 words of one frame are added to the input of an error correction decoder shown in FIGS. 4A and 4B. There is a possibility such that those words include errors since they are the reproduced data. If no error is detected, the 32 words which are added to the input of this decoder coincide with the 32 words which appear at the output of the error correction encoder. In the error correction decoder, the deinterleave processing corresponding to the interleave processing in the encoder is performed and the data sequence is returned to the original sequence. Thereafter, the error correction is performed.

First, a deinterleave circuit 16 in which one-word delay circuits are inserted for the odd-number designated transmission channels is provided. Also, inverters 17, 18, 19, and 20 are inserted for the check word series and each data is supplied to a decoder 21 at the first stage. As shown in FIG. 5, in the decoder 21, syndromes $S_{10}$, $S_{11}$, $S_{12}$, and $S_{13}$ are generated from a parity check matrix $H_{c1}$ and 32 words ($V^T$) input and the well known error correction is performed on the basis of those syndromes. α denotes an element over GF ($2^8$) of $F(x) = x^8 + x^4 + x^3 + x^2 + 1$. The 24 PCM data series and four check word series are supplied from the decoder 21. A pointer of at least one bit ("1" when an error is detected; "0" when no error is detected) indicative of the presence and absence of the error is added for every word of these data series. In FIG. 5 and FIG. 6 which will be explained later and in the following description, even when one word was received, it is merely expressed as $W_i$. The output data series of the decoder 21 are supplied to a deinterleave circuit 22. The deinterleave circuit 22 serves to cancel the delay processing which is performed by the interleave circuit 9 in the error correction encoder. Delay circuits having different delay amounts (27D, 26D, 25D, . . . , 2D, 1D) are inserted in the first to the 27th transmission channels, respectively. The outputs of the deinterleave circuit 22 are supplied to a decoder 23 at the next stage as shown in FIG. 4B. As shown in FIG. 6, in the decoder 23, syndromes $S_{20}$, $S_{21}$, $S_{22}$, and $S_{23}$ are generated from a parity check matrix $H_{c2}$ and the 28 words input. The error correction is carried out on the basis of those syndromes.

The data series which appear at the outputs of the decoder 23 at the next stage are supplied to an even/odd deinterleave circuit 24. In the even/odd deinterleave circuit 24, the PCM data series consisting of the even-number designated words and the PCM data series consisting of the odd-number designated words are returned so as to be located in the alternate transmission channels. Also, one-word delay circuits are inserted for the PCM data series consisting of the odd-number designated words. The PCM data series having the entirely same arrangement as that supplied to the inputs of the error correction encoder and having predetermined designated number of transmission channels are obtained from the outputs of the even/odd deinterleave circuit 24. Although not shown in FIG. 4B, a correcting circuit is provided behind the even/odd deinterleave circuit 24, thereby performing the correction such as to make the errors which could not be corrected by the decoders 21 and 23 inconspicuous, for example, the mean value interpolation.

However, in the case where there is no correlation between the data before and behind the error data such as in case of a computer program, it is vain to perform the interpolation. Therefore, a possibility of error correction is raised by writing data twice as will be mentioned later.

Figure 7:
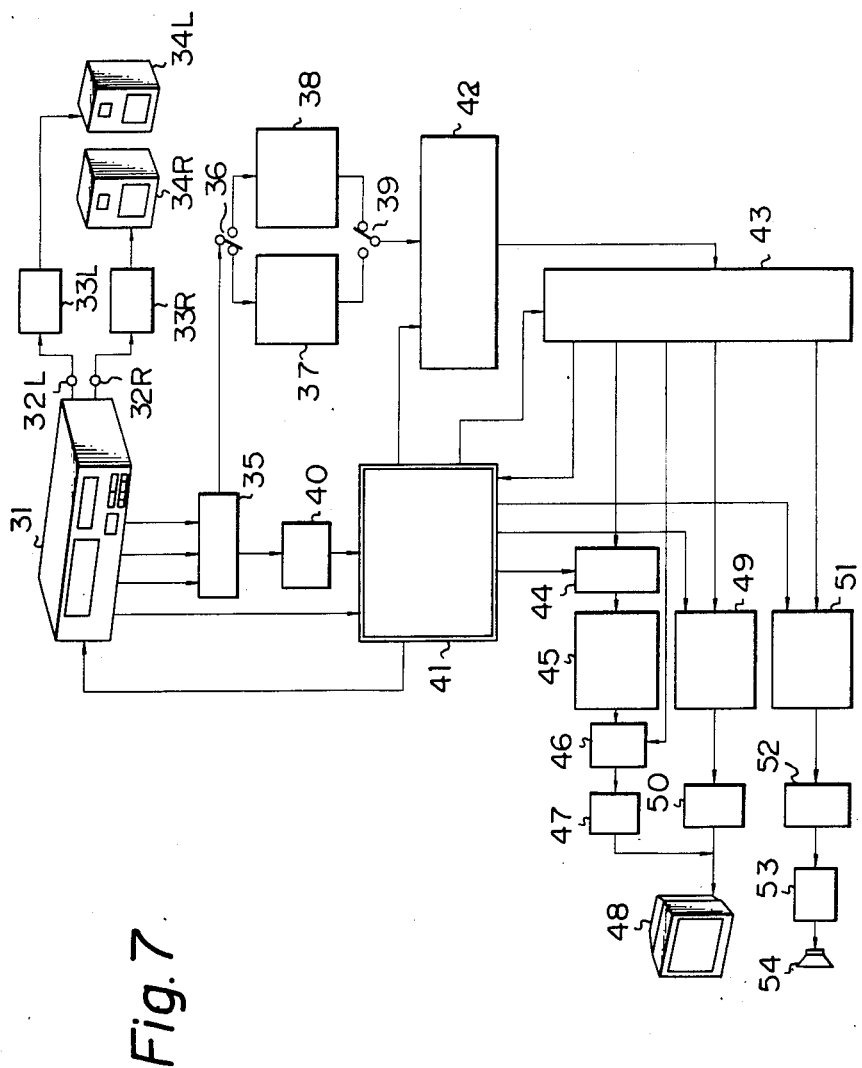
FIG. 7 is a block diagram showing the whole arrangement of an embodiment of the present invention.

FIG. 7 shows the whole arrangement of an embodiment of the present invention, in which a numeral 31 denotes a compact disc player.

Right channel and left-channel signals of the reproduced stereo signals are obtained at output terminals 32L and 32R of the disc player 31, respectively. The audio signals in the respective channels are supplied to speakers 34L and 34R through amplifiers 33L and 33R, respectively, so that the user can reproduce a stereophonic music program.

On the other hand, in the case where the disc which is reproduced by the disc player 31 is the disc on which digital data other than the stereo music signals are recorded, the reproduced data of this disc is supplied to a series/parallel converter 35. A frame pulse and a bit clock synchronized with the reproduced data are supplied from the disc player 31 to the series/parallel converter 35. The data which was converted to the parallel data for every symbol (eight bits) is outputted from the series/parallel converter 35. This parallel data is alternately written into buffer memories 37 and 38 through an input switch 36. Also, a separating circuit 40 for the control data is provided in association with the series/parallel converter 35.

A numeral 41 represents a controller consisting of a microcomputer. The control data from the separating circuit 40 is supplied to the controller 41 and the subcoding signal from the disc player 31 is also supplied to the controller 41. An identification code to indicate whether the signal recorded on the disc to be played back is the stereo music signals or digital data is inserted in the Q-channel subcoding signal. The controller 41 generates a control signal for controlling the switching of the reproduced output signal paths of the disc player 31 on the basis of that identification code and supplies this control signal to the disc player 31.

In addition, the outputs of the buffer memories 37 and 38 are alternately read out by an output switch 39 and are supplied to a DMA controller 42. The reason why the buffer memories 37 and 38 are provided is that the reproduced data of the compact disc is read out at a high speed. The DMA controller 42 is controlled by the controller 41. For example, as will be mentioned later, in the case where the digital data is the sound data, there are two kinds of numbers of bits of one word, such as ten bits and twelve bits. Therefore, this difference in number of bits is set in the DMA controller 42.

The output of the DMA controller 42 is supplied to a data selector 43. The data selector 43 is controlled by the controller 41 and supplies the output data of the DMA controller 42 to different circuits in accordance with the graphic mode, still picture mode, sound mode, and data mode. In the graphic mode, the display data is supplied to a CRT controller 44, and at the same time the color designation data for forming the color look-up table for color designation is supplied to the data input terminal of an RAM 46. A video RAM 45 is connected to the CRT controller 44. The output of the video RAM 45 becomes the readout address input to the RAM 46. The display data of a predetermined color specified by the color look-up table is derived from the output of the RAM 46 and is converted to the analog color video signal by a D/A converter 47. This color video signal is supplied to the input terminal of a CRT display 48. The CRT controller 44 is controlled by the controller 41.

In the still picture mode, the image data constituted by the respective components of Y, U and V is written in a frame memory 49. The write and readout controls and address control of the frame memory 49 are performed by the controller 41. The still image data repeatedly read out for every frame from the frame memory 49 is converted to the analog color video signal by a D/A converter 50 and is supplied to the CRT display 48.

In the sound mode, the digital audio signal is supplied to a sound memory 51 and is subjected to the processings for expansion of the time base and removal of the variation in time base. The operation of the sound memory 51 is controlled by the controller 41. The audio data read out from the sound memory 51 is converted to the analog audio signal by a D/A converter 52 and is supplied to a speaker 54 through an amplifier 53. The clock pulses for the D/A converters 47, 50 and 52 are supplied from the controller 41 although they are not shown.

In the data mode, the output of the data selector 43 is supplied to the controller (microcomputer) 41. In this data mode, the compact disc is used as an external ROM. Data of a video game or other software is reproduced from the compact disc and is supplied to the controller 41.

The controller 41 generates a select signal for controlling the data selector 43 from the mode information included in the control data from the separating circuit 40. In addition, there is a case where the data in several operating modes among these four operating modes have been recorded on one compact disc. In particular, it is useful to superimpose the still picture by the data in the still picture mode and the character indication by the data in the graphic mode, or to generate the voice for explaining the displayed picture in the still picture mode or graphic mode by use of the data in the sound mode.

It will be described a data format in case of recording the above-mentioned digital data other than the stereo music signal on the compact disc.

In one embodiment of this invention, the digital data is recorded on the compact disc in the same format as that of the data stream of the conventional compact disc as shown in FIG. 1. This digital data is encoded into the error correction code in the same method as that regarding the stereo music signal mentioned previously, and is added with the subcoding signals consisting of the P to W channels, then recorded. One block of the digital data is constituted by the data having a length of two frames.

Figure 8:
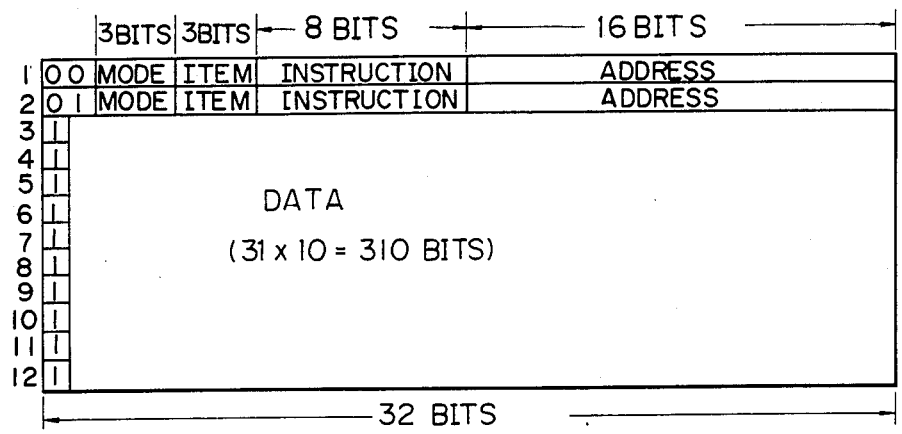
FIGS. 8 and 9 are schematic diagrams showing an arrangement of one block and a part thereof when digital data in an embodiment of the invention is recorded.

As shown in FIG. 8, one block of the digital data is constituted by twelve lines ($32 \times 12 = 384$ bits) each of which consists of 32 bits. As mentioned above, data of ($16 \times 6 \times 2 = 192$ bits) is inserted in one frame of the recording signal on the compact disc. Therefore, one block of the digital data is the data corresponding to two frames. The data of one block is sequentially supplied from the above-mentioned error correction encoders 8 and 10 and interleave circuit 9 and the like in accordance with the sequence of the first line, second line, third line, . . . , twelfth line and the output is recorded on the compact disc in the format shown in FIGS. 1 and 2.

The first two bits of the first line are set to (0 0), the first two bits of the second line are set to (0 1), and the first one bit of each line from the third line to the twelfth line is all set to 1. In this way, since the first one bit of each of the first and second lines of one block is set to 0, the delimiter of one block is indicated. The reason why the first two bits of the first and second lines are different is to distinguish the first and second lines. In addition, the control data and address data are arranged in the first and second lines of one block.

The control data consists of 3-bit mode, 3-bit item and 8-bit instruction. The remaining 16 bits are the address data. These numbers of bits are shown as an example and may be set to other numbers of bits. The mode is used to designate either one of the four modes of the graphic mode, still picture mode, sound mode, and data mode. The item is used to designate a further detailed mode in this mode. For instance, in the graphic mode, the full graphic mode and the font mode are distinguished, or the difference in number of quantization bits (10 bits or 12 bits) in the sound mode is distinguished. The instruction is the command in each mode. The address data represents the addresses (column address and row address) or the page information of the data in the block on the display region in the graphic mode or still picture mode.

These control data and address data are the more significant data as compared with the data in one block. Assuming that even only one bit of the mode is different, the different mode will have been designated. For example, if the data in the graphic mode is erroneously processed as the data in the sound mode, it will be supplied to the speaker 54 and abnormal sound is generated. Therefore, in one embodiment of the invention, the same data as the control data and address data of the first line are inserted in the second line and are written twice. Due to this double writing, by abandoning the data with error and by fetching only the correct data on the reproducing side, in most of the cases, the correct control data and address data can be restored.

In the compact disc, the very effective error correction coding using the cross interleave and Reed Solomon codes is performed. Particularly, as shown in FIG. 3A, the even/odd interleave is carried out for each channel. Therefore, in the ordinary state whereby the compact disc does not have a large flaw, the continuous three words (one word consists of 16 bits) do not become the uncorrectable erroneous words. The correct control data and address data can be obtained on the reproducing side by use of this property. In the separating circuit 40 in FIG. 7, the processing for separating the correct control data and address data is executed. For this purpose, although not shown, an error flag indicative of the presence and absence of the error on the word unit basis is supplied to the separating circuit 40 from the disc player 31.

Figure 9:
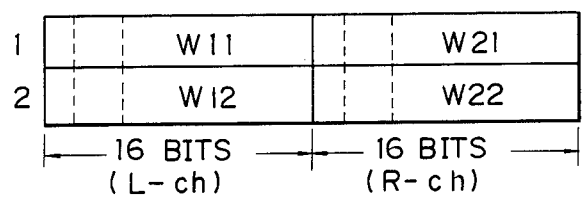

Now, when only the portions of the first and second lines of one block are taken out, as shown in FIG. 9, they can be expressed as words $W_{11}$, $W_{21}$, $W_{12}$, and $W_{22}$ each consisting of 16 bits. The words $W_{11}$ and $W_{12}$ each of which includes the bits representing the delimiter of the block, mode and item have the mutually same bit pattern when no error is detected. Similarly, the words $W_{21}$ and $W_{22}$ consisting of the address data have the mutually same bit pattern when no error is detected. As mentioned above, since the reproduced data of the compact disc player 31 ordinarily does not include continuous three-word error, two words including no error can be derived by selecting either word $W_{11}$ or $W_{12}$ and either word $W_{21}$ or $W_{22}$.

First, in the case where all of the words are correct, where one of $W_{12}$ and $W_{22}$ is the erroneous word, or where two words of $W_{12}$ and $W_{22}$ are the erroneous words, the two words of $W_{11}$ and $W_{21}$ are outputted from the separating circuit 40.

In the case where $W_{11}$ is the erroneous word, the two words of $W_{12}$ and $W_{21}$ are outputted from the separating circuit 40. In the case where $W_{21}$ is the erroneous word, the two words of $W_{11}$ and $W_{22}$ are outputted from the separating circuit 40. In this way, the control data and address data without an error can be obtained from the separating circuit 40 on the ordinary condition.

In addition, the sum of the data of ten lines from the third to twelfth lines in one block excluding the first one bit of each line is (31×10=310 bits). The data arrangement of these 310 bits differs in dependence upon the operating mode.

Figure 10:
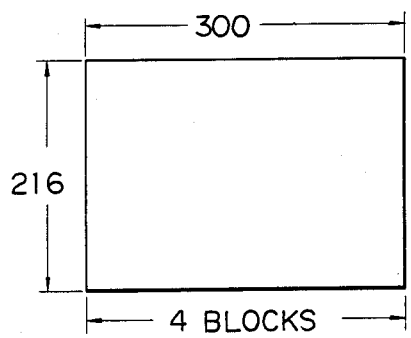

The first mode is determined to be the graphic mode and three bits for a command are set to (0 0 1). This graphic mode includes the full graphic mode and font mode and both are made different depending upon the item. In the full graphic mode the three bits are (0 0 1), the memory region corresponding to the display region has a size in which the longitudinal length is 216 lines and the transverse length is 300 pixels as shown in FIG. 10, and the total number of pixels is (300×216=64800 pixels).

One pixel, i.e., one dot consists of four bits and these four bits become the read address input to a predetermined color look-up table. In the graphic mode, the data constituting this color look-up table is also reproduced. In case of the graphic mode, one block is constituted as shown in FIG. 11. FIG. 11 shows the case of full graphic mode, in which three bits for item are set to (0 0 1). The address data consists of the horizontal 10-bit column address and the vertical 6-bit row address. As mentioned before, the data of the first and second lines excluding the first two bits are the data which were written twice.

Seventy five dot data $D_1$ to $D_{75}$ each consisting of four bits excluding the first one bit are arranged in the third to twelfth lines in one block. Therefore, one line in the full graphic mode is constituted by the data of four blocks and the whole region consists of (4×216=864 blocks). Eventually, 10-bit data blank occurs in one block. Since the block frequency of the data reproduced from the compact disc is 3.675 kHz, it takes a time of $$\left( 864 \times \frac{1}{3675} = 0.235 \text{ sec} \right)$$

to reproduce one picture in the graphic mode.

In the above-mentioned graphic mode and the still picture mode and sound mode which will be mentioned later, the control data and address data which are arranged in the first and second lines are written twice. However, they are not written twice with respect to the data region of 310 bits but the transmission time is reduced. In the data mode, since significance of each data is large, not only the control data and address data but also the data are written twice.

In the still picture mode as the second mode, a color still picture is formed by color components of luminance data Y and color difference data U and V.

As shown in FIG. 12, the memory region of the frame memory 49 is constituted by 488 lines and each line consists of 651 pixels. One pixel consists of eight bits and the frame memory 49 has eight bits in the direction of depth. All of the luminance data Y is written in this memory region. On the other hand, with regard to the color difference data U and V, the data of one sample is commonly used for three pixels. As shown in FIG. 12, each of the color difference data U and V has (217 pixels×488 lines) per one frame. Therefore, three pixels are formed by total five bytes consisting of the luminance data Y of three bytes and the color difference data U and V each of which consists of one byte.

In addition to the Y-U-V method, the R-G-B method and the monochrome still picture mode are included in this still picture mode and they are distinguished by the three bits identifying the particular item. As shown in FIG. 13, in the still picture mode by the Y-U-V method mentioned above, three bits for mode are set to (0 1 0) and three bits for item are set to (0 0 1). The instruction and address data are also inserted similarly to the case of the graphic mode. The luminance data $Y_1$ to $Y_{21}$ of 21 samples each consisting of one byte are inserted sequentially from the second bit of the third line. Thereafter, the color difference data $V_1$ to $V_7$ of seven samples are inserted. Further, thereafter, the other color difference data $U_1$ to $U_7$ of seven samples are inserted. The luminance data of three samples, e.g., $Y_1$, $Y_2$ and $Y_3$ and the color difference data of one sample, e.g., $U_1$ and $V_1$ are combined to form the data of one pixel. Therefore, the data of 21 pixels (=35 bytes=280 bits) are inserted in one block. Eventually, the data blanking of 30 bits exists in one block. In addition, one line in the memory region of the frame memory 49 consists of 31 blocks. In the graphic mode and still picture mode, the number of bits of the address data can be reduced by setting the number of pixels of one line to an integer times the number of blocks. In this still picture mode, it takes a time of $$\left(31 \times 488 \times \frac{1}{3675} = 4.116 \text{ sec}\right)$$

to reproduce one picture.

The sound mode as the third mode will now be explained. In the sound mode, three bits for mode are set to (0 1 1). In addition, as shown in FIG. 14, the sound mode includes more detailed operating modes which are distinguished by the three bits for item.

In case of the item of (0 0 0), for example, the operation of the amplifier 53 is turned off and the voice path is muted.

The cases of the items of (0 0 1), (0 1 0) and (0 1 1) denote that the sampling frequency SF is 22.05 kHz and the number of bits of one sample is ten bits and the audio data which was non-linearly quantized has been recorded. On the other hand, a magnification factor in FIG. 14 represents the ratio between the audio data and the image data (still picture data or graphic data).

As shown in FIG. 15A, a magnification factor when there is only image data (indicated at P) and it is continuous is 0. As shown in FIG. 15B, a magnification factor is 2/5 in the case where three blocks out of five blocks are image data and the other two blocks are the audio data (indicated at S) in the sound mode. As shown in FIG. 15C, a magnification factor is 3/5 in the case where two blocks out of the five blocks are image data and the other three blocks are the audio data. As shown in FIG. 15D, a magnification factor is $\frac{3}{4}$ in the case where one block out of four continuous blocks is image data and the other three blocks are the audio data. Further, as shown in FIG. 15E, a magnification factor is 1 in the case where the blocks of audio data are continuous.

The reason why the block of the image data and the block of the audio data are mixed in this way is to permit the voice information to keep pace with the reproduction of the image information. As a magnification factor increases, it takes a longer time to reproduce one still picture. Thus, this makes it possible to select a suitable magnification factor in accordance with the information amount of the image information and audio information.

In case of the item of (0 0 1), a magnification factor is 2/5 in two channels. In case of the item of (0 1 0), a magnification factor is 3/5 in three channels. In case of the item of (0 1 1), a magnification factor is 1 in five channels. In case of recording the stereo music signal on the compact disc, the sampling frequency SF is set to 44.1 kHz, the number of channels is two, one sample consists of 16 bits, and the linear quantization is performed. In comparison with this stereo music signal, the reproduced sound in the sound mode deteriorates in quality in terms of the dynamic range and frequency response. However, the sound mode is provided for explanation of the still picture and the like, so that the above point will not cause a problem. Also, since the number of channels can be increased, there is an advantage such that it is possible to explain in a plurality of foreign languages as well as Japanese.

On the other hand, in case of transmitting the audio signal with relatively high quality in the sound mode, another mode in that three bits for item are set to (1 0 0) is provided in consideration of the transmission of, e.g., music. Namely, the number of channels is two, the sampling frequency is 33.075 kHz, one sample consists of 12 bits, the non-linear quantization is performed, and a magnification factor is $\frac{3}{4}$. In this operating mode, it is possible to reproduce the audio information of a quality substantially equal to that in case of the above-mentioned stereo music signal.

FIG. 16 shows a data arrangement of one block in the cases where the item is (0 0 1), (0 1 0) and (0 1 1) in the sound mode. The address data is unnecessary in the sound mode and this section becomes the data blank or is used as the portion for necessary control data. The data $D_1$ to $D_{30}$ each sample of which consists of ten bits are sequentially arranged in the data region excluding the first bit of each line of one block. Therefore, the data of 300 bits is inserted in one block and the remaining ten bits are set to the data blank. In case of two channels and the item of (0 0 1), $D_{2n-1}$ is the A-channel data and $D_{2n}$ is the B-channel data. In case of three channels and the item of (0 1 0), $D_{3n-2}$ is the A-channel data, $D_{3n-1}$ is the B-channel data, and $D_{3n}$ is the C-channel data. In case of five channels and the item of (0 1 1), $D_{5n-1}$ is the A-channel data, $D_{5n-2}$ is the B-channel data, $D_{5n-3}$ is the C-channel data, $D_{5n-4}$ is the D-channel data, and $D_{5n}$ is the E-channel data.

In addition, in case of the item of (1 0 0), since the number of bits of one sample is 12 bits, a data arrangement of one block is as shown in FIG. 17. Namely, the data of $D_1$ to $D_{24}$ each sample of which consists of 12 bits are sequentially arranged. $D_{2n-1}$ is the A-channel data and $D_{2n}$ is the B-channel data. Thus, (24×12=288 bits) are inserted in one block.

In each operating mode of the above sound mode, the audio data of only an amount such that the lack of data does not occur can be inserted in one block even in the case where a magnification factor is other than 1 and the audio data intermittently exists in the reproduction data.

In the data mode as the fourth mode, three bits for mode are set to (1 0 0). In the data mode, the case where three bits for item are set to (0 0 1) corresponds to the double writing mode.

Figures 18, 19:
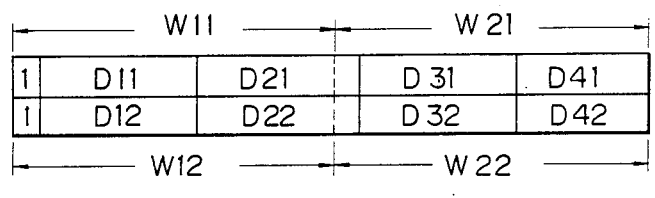
FIGS. 18 and 19 are schematic diagrams showing a data arrangement of one block and a part thereof in a data mode.

FIG. 18 shows a data arrangement of one block in the double writing mode. Ten lines from the 3rd to 12th lines of one block are divided into five sets each consisting of two lines, and the recording is done such that the same data is located on two lines of each set. This data consists of eight bits and the 19 data samples of $D_1$ to $D_{19}$ (8×19×2=304 bits) are inserted in one block, where six bits are set to the data blank.

By writing twice, the data without an error can be fetched similarly to the above-mentioned control data and address data. As an example, the case will be explained where the data $D_2$ is fetched from the third and fourth lines in which the data $D_1$, $D_2$, $D_3$, and $D_4$ are included.

As shown in FIG. 19, the data of which those four data were written twice are expressed by $(D_{11}, D_{12})$, $(D_{21}, D_{22})$, $(D_{31}, D_{32})$, and $(D_{41}, D_{42})$, respectively. In addition, for the reproduced data of an ordinary compact disc, continuous three words, e.g., $W_{11}$, $W_{21}$ and $W_{12}$ do not become the erroneous words. The use of this property enables the data $D_2$ including no error to be fetched in the manner as will be mentioned below.

In the cases where the word $W_{11}$ is the erroneous word, where the word $W_{21}$ is the erroneous word, and where the words $W_{11}$ and $W_{21}$ are the erroneous words, the data $D_{22}$ is fetched from the words $W_{12}$ and $W_{22}$.

In the case where the words $W_{21}$ and $W_{12}$ are the erroneous words, seven bits of the data $D_{21}$ included in the word $W_{11}$ and one bit of the data $D_{22}$ included in the word $W_{22}$ are fetched as the data $D_2$.

In the cases where the word $W_{12}$ or $W_{22}$ is the erroneous word and where the words $W_{12}$ and $W_{22}$ are the erroneous words, the data $D_{21}$ is fetched from the words $W_{11}$ and $W_{21}$.

The processing for fetching the above data without an error is performed by the controller 41. Although not shown, an error flag on the word unit basis from the disc player 31 is supplied to the controller 41 and is used for this processing.

Figures 20, 21:
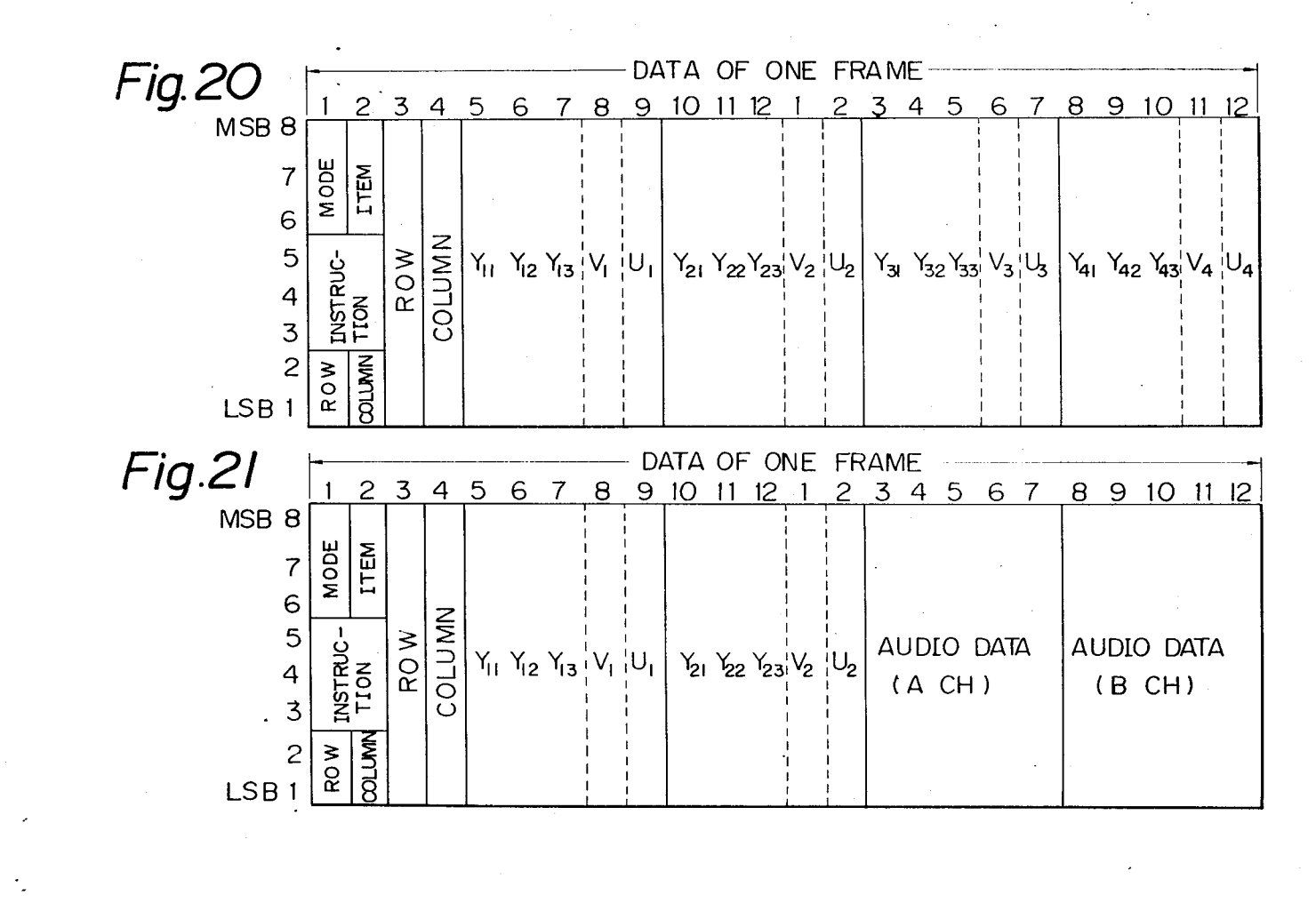

FIGS. 20, 21, 22, and 23 show other embodiments of an arrangement of one block of this digital data, respectively. In this example, three kinds of modes are used as the digital data. The first mode consists of only the color still picture data. The second mode consists of the color still picture data and the two-channel audio data. The third mode consists of the color still picture data and the three-channel audio data. The fourth mode consists of the color still picture data and the five-channel audio data. FIG. 20 shows a data arrangement of one block in the first mode. A unit of data consists of eight bits and $(12 \times 2 = 24)$ data exist in one block. Four data at the edge portion in FIG. 20 are the control data and address data. The control data consists of three bits for mode, three bits for item and six bits for instruction. The mode serves to distinguish the graphic mode, still picture mode and the like. The item serves to designate a further detailed mode in this mode. This embodiment is in the still picture mode and the foregoing first to fourth modes are distinguished by the item. The instruction is the command in each mode. On the other hand, the address data consists of row and column each of ten bits representing the respective vertical and horizontal addresses of the display region. In the first mode, the other twenty data in one block are the still picture data. In this example, the image data formed by coding the components consisting of the luminance data Y and two color difference data V and U is used. In addition, the ratio is such that the color difference data of one sample is used for the luminance data of three samples. In the first mode, the luminance data $Y_{11}$, $Y_{12}$, $Y_{13}$, ..., $Y_{42}$, and $Y_{43}$ of twelve samples and the color difference data $V_1$ to $V_4$ and $U_1$ to $U_4$ of each sample are inserted in one block.

As an example, it is assumed that the number of vertical pixels necessary to display one still picture is 576 and the number of horizontal pixels is 612 and the total number of pixels is $(576 \times 612 = 352512)$. For the compact disc, it takes $$\frac{352512}{7350 \times 3 \times 4} = 3.997 \text{ sec}$$

to reproduce the data of 7350 frames per second.

In the second mode, as shown in FIG. 21, the control data and address data similar to those mentioned above are inserted in one block, while the color still picture data of two pixels and the audio data in two channels of A and B are inserted therein. The audio data of five samples per channel of which one sample consists of eight bits are inserted. In the existing compact disc, the sampling frequency is 44.1 kHz and six samples are inserted in one frame, so that the reduction ratio of the number of samples is 5/6. When it is assumed that the transmission band is (1/2.2) of the sampling frequency, the transmission band of the audio signal in the second mode will be $$44.1 \times \frac{5}{6} \times \frac{1}{2.2} = 16.7 \text{ kHz.}$$

In addition, the time necessary to reproduce the data of one still picture is twice that in the first mode and the number of pictures which can be recorded on one compact disc is reduced by ½.

In the third mode, as shown in FIG. 22, the control data and address data similar to those mentioned above are inserted, and the color still picture data of two pixels and the audio data in total three channels of A, B and C are inserted. The audio data are inserted in one block at the ratio of three samples per channel. The reproducing time of the data on one still picture is the same as that in the second mode. On one hand, in the third mode, one data in one block becomes an excessive data.

In the fourth mode, as shown in FIG. 23, the control data and address data similar to those mentioned above are inserted, and the color still picture data of one pixel and the audio data of total five channels of A, B, C, D, and E are inserted. The audio data are inserted in one block at the ratio of three samples per channel.

In the third and fourth modes, since the number of samples in one channel is reduced to half of that of the existing compact disc, the transmission band of the audio signal will have decreased to 10.02 kHz. Therefore, the sampling frequency of each of the audio data in the third and fourth modes is increased by 1.5 times. This makes it possible to expand the transmission band of the audio data to $$44.1 \times \frac{3}{6} \times 1.5 \times \frac{1}{2.2} = 15.03 \text{ kHz}$$

In addition, to increasing the sampling frequency by 1.5 times, the linear velocity of the compact disc upon reproduction is also increased by 1.5 times. Since the existing compact disc is rotated at a constant linear velocity of 1.25 m/sec, the linear velocity is set to 1.875 m/sec in the third and fourth modes.

In this way, by increasing the linear velocity upon reproduction by 1.5 times, the reproducing time of the data of one still picture is shortened to 5.33 sec (in the third mode) and 10.66 sec (in the fourth mode). The number of still pictures which can be recorded on one compact disc is not reduced. Although the reproducing time is shortened to 40 minutes as compared with the existing compact disc (60 minutes), it will not practically cause any problem.

On the other hand, to make the transmission band of the audio data equal to that (20 kHz) of the existing compact disc, it is necessary to increase the linear velocity by 1.2 times in the second mode and to increase the linear velocity by two times in the third mode.

To identify the above-mentioned difference in linear velocity upon reproduction, control data is recorded on the compact disc.

Since the TOC (Table Of Contents) data is recorded at the location of the innermost rim of the compact disc, the identification data is inserted in the control bits of this portion or in the control bits of the subcoding signal (Q channel). The control bits consist of four bits and are defined as follows for the existing compact disc.

0 0 0 0: Two-channel audio data to which no preemphasis is applied 1 0 0 0: Four-channel audio data to which no preemphasis is applied 0 0 0 1: Two-channel audio data to which the preemphasis was applied 1 0 0 1: Four-channel audio data to which the preemphasis was applied The following definition is added as the meanings of the control bits.

0 0 1 0: Same speed playback
0 1 0 0: Double speed playback
0 1 1 0: 1.2-time speed playback This corresponds to the case of enlarging the transmission band of the audio data to 20 kHz. The use of these control bits makes it possible to distinguish the compact disc on which the two-channel stereo audio signals were recorded in the manner as in the existing compact disc and the compact disc on which the digital data including the image data was recorded.

Figure 24:
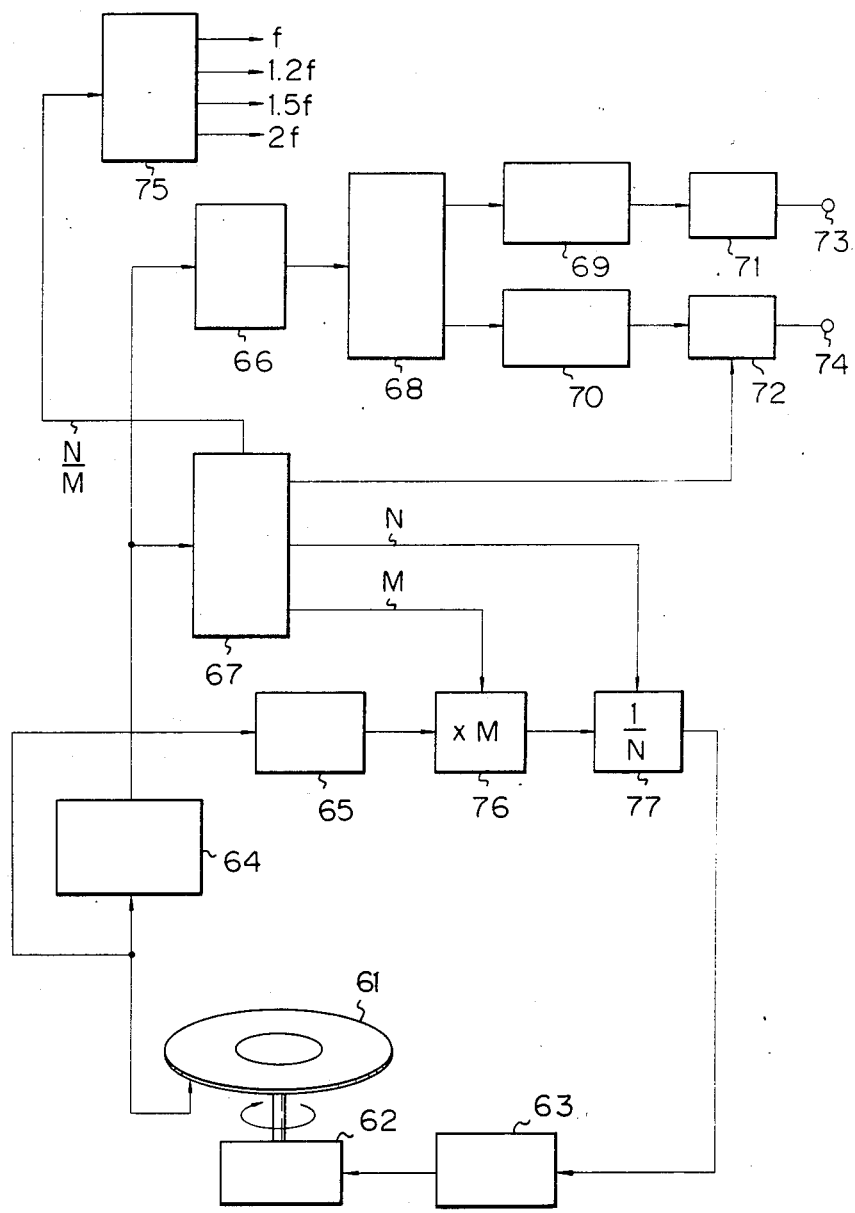
FIG. 24 is a block diagram of another embodiment of the invention.

A constitution of one embodiment of the present invention will now be explained with reference to FIG. 24. In FIG. 24, a numeral 61 denotes a compact disc and 62 indicates a motor for rotating the compact disc 61. The signals reproduced from the compact disc 61 by an optical pick-up (not shown) are supplied to a reproducing processor 64 and a sync detector 65.

The reproducing processor 64 includes an RF amplifier, a bit clock regenerating circuit, an EFM demodulator, an error correcting circuit, etc. The reproduced data is obtained at the output of the processor 64. The sync detector 65 detects a frame sync pulse. The reproduced data from the reproducing processor 64 is supplied to a data separating circuit 66 and a control data regenerating circuit 67. The control data regenerating circuit 67 generates predetermined change-over signals from the data for designating the linear velocity of the compact disc upon reproduction and the control data (mode and item) added to the digital data.

The data separating circuit 66 separates the digital data and this digital data separated is supplied to a data distributing circuit 68, where it is divided into the video data and the audio data. The video data and audio data from the data distributing circuit 68 are supplied to an image reproducing circuit 69 and an audio reproducing circuit 70, respectively. The image reproducing circuit 69 includes a frame memory for storing the video data, a D/A converter, and the like. The analog color video signal appearing at the output of the circuit 69 is supplied to an output terminal 73 through a low-pass filter 71. The audio reproducing circuit 70 includes a memory, a D/A converter, etc. The analog audio signal appearing at the output of the circuit 70 is supplied to an output terminal 74 through a low-pass filter 72. Although not shown, an image reproducing apparatus and an audio reproducing apparatus are connected to the output terminals 73 and 74, respectively. The passing band of the low-pass filter 72 can be switched to any one of a plurality of passing bands.

Also, a clock generator 75 for generating a clock pulse which is used for data processing of each circuit of the above-mentioned reproducing system is provided. Further, a servo circuit 63 is provided in association with the motor 62 for rotating the compact disc 61. The output signal of the sync detector 65 is supplied to the servo circuit 63 through a multiplier 76 for multiplying the frequency of such an output signal by M and a 1/N frequency divider 77.

The control data regenerating circuit 67 generates a change-over signal for switching the band of the low-pass filter 72, a change-over signal for changing the frequency of the clock pulse formed by the clock generator 75 at the ratio of N/M, a change-over signal for setting a coefficient M of the frequency multiplier 76, and a change-over signal for setting a coefficient N of the frequency divider 77. In the case where the control data included in the reproduced data instructs the same speed playback, (M=N=1) is set. Due to this, a clock pulse having a frequency of f is generated from the clock generator 75 and the band of the low-pass filter 72 is set to 20 kHz. The signal having the frame frequency from the sync detector 65 is supplied to the servo circuit 63. A typical example of this same speed playback corresponds to the case of playing back the compact disc on which the existing stereo music signals have been recorded.

In addition, when the control data instructs the 1.2-time speed playback, (M=5, N=6) are set. At this time, a clock pulse having a frequency of 1.2 f is generated from the clock generator 75 and the frequency of the signal supplied to the servo circuit 63 is reduced to 5/6. Since the servo circuit 63 controls the rotating speed of the motor 62 such that the frequency of the signal supplied from the frequency divider 77 is equal to the frame frequency, the linear velocity of the compact disc is increased by 1.2 times. The passing band of the low-pass filter 72 differs in dependence upon which mode among the above-mentioned plurality of modes does the reproduced digital data belong to. In case of the digital data in the second mode, the passing band of the low-pass filter 72 is set to 20 kHz. In case of the digital data in the third to fourth mode, the passing band is set to 12 kHz.

Further, even when the control data instructs the 1.5-time speed playback or double speed playback, similarly to the above cases, the compact disc 61 is rotated at the instructed linear velocity and the frequency of the clock pulse and the passing band of the low-pass filter 72 are changed to the band suitable for the reproduced data.

According to this embodiment, when both of the video data and the audio data are recorded on the digital disc, it is possible to prevent the reduction in audio signal band in association with a decrease in number of samples of the audio data. In addition, the number of audio channels can be set to multi-channels, thereby enabling the voice information in Japanese and in a plurality of foreign languages to be recorded. For instance, the explanation by voice regarding the pictures for traveler's guide can be made in a plurality of foreign languages.

This invention is not limited to the optical disc but can be also applied to a disc on which a digital signal is recorded as a change in electrostatic capacity, or the like.

According to the present invention, on a disc for use of reproduction of the stereo music signals such as a compact disc which has already been commercially available, it is possible to record the digital data other than the stereo music signals while keeping consistency of the signal format and signal processing such as the error correcting method, the format of the recording data, etc. Therefore, by adding a data processing section such as a microcomputer or the like, a color CRT, a speaker as adapters to the existing disc player, various image information and audio information can be reproduced, thereby enabling an applicable range of the disc to be enlarged.

What is claimed is:

1. A method of arranging digital data including control data for subsequent recording in tracks on a rotating disc, comprising the steps of:
    arranging the data and control data into a block having a predetermined number of lines each line including a predetermined number of words;
    interleaving the data and control data using odd/even interleaving, where odd and even represent alternate successive lines;
    generating error correction words from the interleaved data and control data; and
    recording the interleaved data and control data and the error correction words on the disc in a line-by-line basis relative to said block, including the step of recording the control data twice in succession, whereby upon playback of said disc said data and control data is rearranged into said block, with said control data in two adjacent lines of said block being identical.

2. A method according to claim 1, further comprising the steps of setting a first two bits of a first line in said block to (0,0), a first two bits of a second line to (0,1), and a first bit of each remaining line in a block to (1).

3. A method according to claim 1, further comprising the steps of dividing the control data into a mode control portion and an address portion.

4. A method according to claim 3, further comprising the step of using said error correction words to detect an error in said mode control portion and said address portion of each of said first and second lines of control data.

5. A method according to claim 4, comprising the further step of selecting a correct mode control portion and a correct address portion using said error correction words.

6. A method according to claim 1, in which said step of recording includes the further step of recording the interleaved data twice in succession on said rotating disc.

* * * * *